W. BEERS.
Axle.
No. 48,895.
Patented July 25, 1865.
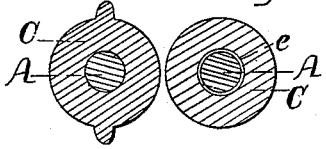
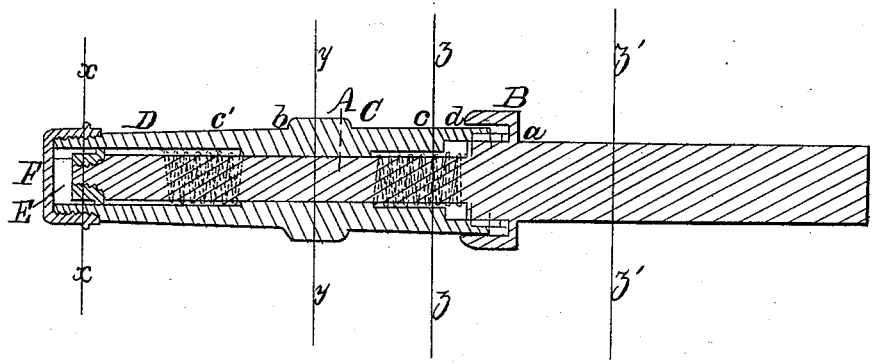
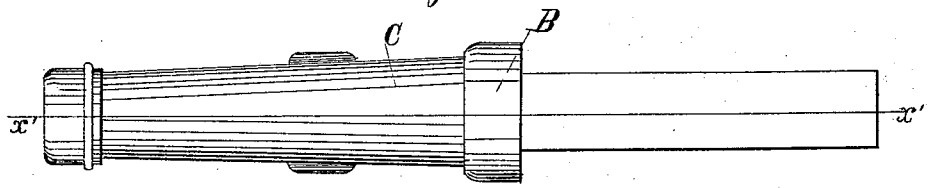
Witnesses
Wm Freuzn
Heo Tusch
Inventor
Wheeler Beers
per Munn & Co
Attorneys

UNITED STATES PATENT OFFICE.

WHEELER BEERS, OF BRIDGEPORT, CONNECTICUT.

IMPROVEMENT IN AXLES FOR VEHICLES.

Specification forming part of Letters Patent No. 48,895, dated July 25, 1865.

*To all whom it may concern:*

Be it known that I, WHEELER BEERS, of Bridgeport, in the county of Fairfield and State of Connecticut, have invented a new and useful Improvement in Axles for Vehicles; and I do hereby declare that the following is a full, clear, and exact description thereof, which will enable others skilled in the art to make and use the same, reference being had to the accompanying drawings, forming part of this specification, in which—

Figures 1, 2, 3, and 4 are transverse sections of my invention, taken, respectively, in the lines $x\ x$, $y\ y$, $z\ z$, $z'\ z'$, Fig. 2; Fig. 2, a central longitudinal section of the same, taken in the line $x\ x$, Fig. 3; and Fig. 3 an external view of the same.

Similar letters of reference indicate corresponding parts.

This invention relates to a new and useful improvement in axles for vehicles, whereby a certain degree of longitudinal play is allowed the box of the hub on the axle, and a corresponding degree of lateral play allowed the wheel, whereby the latter will be protected from undue strains and also from lateral jars or concussions, and much wear and tear prevented, and also the body of the vehicle prevented from being racked.

To this end the invention consists in the application of spiral springs to the axle, in the manner hereinafter fully shown and described, whereby the wheel is allowed to yield or give on the axle in either direction—that is to say, either toward or from the body of the vehicle.

A represents an axle, and B a collar at its inner end, to receive the inner end of the box C, $a$ being a washer fitted in the collar to serve as a stop or bearing for the inner end of the box C when the latter is shoved or forced inward. (See Fig. 2.) The axle A is constructed in the usual manner, but the box C is provided internally with a circumferential projection, $b$, which bears on the axle A and leaves a space between the box and axle at each end of $b$ to receive spiral springs $c\ c'$. The outer end of the spring $c$ bears against the inner end of the projection $b$, and its inner end bears against a shoulder, $d$, at the inner end of the axle. The inner end of the spring $c'$ bears against the outer end of the projection $b$, and its outer end bears against a tube or thimble, D, which is fitted on the axle and is secured thereon by a nut, E, said tube or thimble serving as a bearing for the box at the outer end of axle. F is a nut which screws over the outer end of the box.

From the above description it will be seen that the box C will be allowed to play on the axle in either direction, toward or from the body of the vehicle, the springs $c\ c'$ preventing jars or concussions, and at the same time admitting of an easy and gradual play of the box C.

I do not claim, broadly, the application of springs to an axle to admit of the lateral movement of the wheels thereon, for I am aware that axles have been provided with one spring, but they have not been generally adopted, as they do not fully preserve a wheel from strains and lateral jars and concussions; but I do claim as new and desire to secure by Letters Patent—

The application of the springs to an axle, in connection with the tube or thimble, the circumferential projection in the interior of the box, and the nut on the outer end of the axle, substantially as and for the purpose set forth.

WHEELER BEERS.

Witnesses:
E. A. PARRETT,
JAMES L. GOULD.